US010890331B2

(12) United States Patent
Kim

(10) Patent No.: US 10,890,331 B2
(45) Date of Patent: Jan. 12, 2021

(54) COOKING APPLIANCE

(71) Applicant: SAMSUNG ELECTRONICS CO., LTD., Suwon-si (KR)

(72) Inventor: Jin Ju Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 443 days.

(21) Appl. No.: 15/672,852

(22) Filed: Aug. 9, 2017

(65) Prior Publication Data

US 2018/0045419 A1 Feb. 15, 2018

(30) Foreign Application Priority Data

Aug. 10, 2016 (KR) ........................ 10-2016-0101847

(51) Int. Cl.

| | |
|---|---|
| ***F24C 3/12*** | (2006.01) |
| ***F24C 7/08*** | (2006.01) |
| ***G05G 1/10*** | (2006.01) |
| ***H01H 19/02*** | (2006.01) |
| ***F24C 15/10*** | (2006.01) |
| ***H05B 3/68*** | (2006.01) |

(Continued)

(52) U.S. Cl.

CPC .............. *F24C 3/126* (2013.01); *F24C 7/082* (2013.01); *F24C 15/10* (2013.01); *G05G 1/105* (2013.01); *H01H 19/025* (2013.01); *H05B 3/68* (2013.01); *F24C 7/00* (2013.01); *F24C 15/2007* (2013.01); *H05B 1/00* (2013.01)

(58) Field of Classification Search

CPC .......... F24C 3/126; F24C 7/082; F24C 15/10; F24C 7/00; F24C 15/2007; G05G 1/105; H01H 19/025; H05B 3/68; H05B 1/00

USPC .... 200/557; 362/555, 551, 580, 581, 27, 30, 362/85; 116/310; 219/451.1

See application file for complete search history.

(56) References Cited

U.S. PATENT DOCUMENTS 2,202,371 A * 5/1940 Bruckman ............. G05D 23/02 74/553
2,693,165 A * 11/1954 Appleman ............. G05G 1/105 116/310

(Continued)

FOREIGN PATENT DOCUMENTS

EP 2701031 2/2014
EP 2 980 486 2/2016

(Continued)

OTHER PUBLICATIONS

International Search Report dated Nov. 14, 2017 in International Patent Application No. PCT/KR2017/008549.

(Continued)

*Primary Examiner* — Jimmy Chou
(74) *Attorney, Agent, or Firm* — Staas & Halsey LLP

(57) ABSTRACT

A cooking appliance includes a knob assembly to emit light to improve an aesthetic feel and user convenience. The cooking appliance includes a main body having at least one heating source, a panel disposed in the main body and provided with a through hole, and a knob assembly coupled to the panel. The knob assembly includes a knob, at least one light source configured to emit light, a first light guide passing through the through hole and arranged to guide the light emitted from the light source, and a second light guide configured to guide the light guided by the first light guide to an outside of the knob.

20 Claims, 15 Drawing Sheets

(51) Int. Cl.
*F24C 7/00* (2006.01)
*F24C 15/20* (2006.01)
*H05B 1/00* (2006.01)

(56) References Cited

U.S. PATENT DOCUMENTS

| | | | | | |
|---|---|---|---|---|---|
| 2,745,217 | A * | 5/1956 | Gold | A01G 7/00 | 99/472 |
| 3,978,305 | A * | 8/1976 | Tanaka | H05B 6/6426 | 219/720 |
| 4,140,048 | A * | 2/1979 | Grove | A47J 37/0814 | 219/489 |
| 4,163,883 | A * | 8/1979 | Boulanger | H01H 13/83 | 200/314 |
| 5,093,764 | A * | 3/1992 | Hasegawa | G05G 1/105 | 116/202 |
| 5,280,145 | A * | 1/1994 | Mosier | H01H 13/7006 | 200/313 |
| 5,403,984 | A * | 4/1995 | Ogawa | H01H 13/705 | 200/313 |
| 5,697,689 | A * | 12/1997 | Levine | G05G 1/105 | 116/286 |
| 5,865,302 | A * | 2/1999 | Suzuki | H01H 9/182 | 200/315 |
| 6,767,104 | B2 | 7/2004 | Worrell | | |
| 7,009,127 | B2 * | 3/2006 | Hoelzle | H01H 23/025 | 200/315 |
| 7,222,979 | B1 * | 5/2007 | Popowich | H01H 19/025 | 200/316 |
| 7,255,061 | B2 * | 8/2007 | Denton | G05G 1/105 | 116/286 |
| 7,350,954 | B2 * | 4/2008 | Snider | G02F 1/133617 | 362/612 |
| 7,399,098 | B2 * | 7/2008 | Nakamoto | H01H 19/025 | 362/23.11 |
| 7,524,074 | B2 * | 4/2009 | Chery | B60K 37/06 | 362/23.21 |
| 8,757,825 | B2 * | 6/2014 | Fendeleur | B60K 37/06 | 362/23.22 |
| 8,783,884 | B2 * | 7/2014 | Baker | G09F 13/04 | 362/23.05 |
| 8,783,927 | B2 * | 7/2014 | Claprood | F24C 7/082 | 362/551 |
| 8,801,206 | B2 | 8/2014 | Chen et al. | | |
| 8,813,676 | B2 * | 8/2014 | Fuller | G05G 1/105 | 116/310 |
| 8,979,289 | B2 * | 3/2015 | Camli | F24C 7/082 | 362/23.09 |
| 9,058,944 | B2 * | 6/2015 | Woo | H01H 21/025 | |
| 9,146,033 | B2 * | 9/2015 | Cadima | F24C 7/082 | |
| 10,330,324 | B2 * | 6/2019 | Bach | F24C 7/082 | |
| 10,345,514 | B2 * | 7/2019 | Kozinski | G02B 6/0096 | |
| 2002/0075668 | A1 * | 6/2002 | Dorrie | H01H 19/025 | 362/23.04 |
| 2002/0190058 | A1 * | 12/2002 | Lev | H05B 1/0213 | 219/512 |
| 2004/0001329 | A1 * | 1/2004 | Worrell | H01H 19/025 | 362/23.21 |
| 2004/0070963 | A1 * | 4/2004 | Miwa | G01D 11/28 | 362/23.15 |
| 2004/0109304 | A1 * | 6/2004 | Yokoyama | H01H 19/025 | 362/23.21 |
| 2006/0219156 | A1 * | 10/2006 | Denton | H01H 19/025 | 116/310 |
| 2006/0238994 | A1 * | 10/2006 | Chery | G02B 6/0001 | 362/23.21 |
| 2007/0147063 | A1 | 6/2007 | Collomb et al. | | |
| 2007/0195513 | A1 * | 8/2007 | Nishiyama | G05G 1/105 | 362/23.21 |
| 2010/0000417 | A1 * | 1/2010 | Tetreault | A47J 37/08 | 99/325 |
| 2010/0181174 | A1 | 7/2010 | Larson et al. | | |
| 2011/0107869 | A1 * | 5/2011 | Kim | B60H 1/0065 | 74/507 |
| 2011/0271896 | A1 * | 11/2011 | Fuller | G05G 1/08 | 116/310 |
| 2011/0297664 | A1 * | 12/2011 | Fukui | F24C 7/082 | 219/220 |
| 2012/0243253 | A1 * | 9/2012 | Claprood | F24C 7/082 | 362/555 |
| 2012/0262937 | A1 * | 10/2012 | Hayashi | B60Q 3/64 | 362/520 |
| 2012/0314397 | A1 * | 12/2012 | Nozaki | H01H 19/025 | 362/23.14 |
| 2013/0163226 | A1 * | 6/2013 | Chen | G05G 1/105 | 362/85 |
| 2013/0213787 | A1 * | 8/2013 | Laicher | H01H 23/003 | 200/557 |
| 2013/0223042 | A1 * | 8/2013 | Kim | F21V 33/00 | 362/23.04 |
| 2013/0228038 | A1 * | 9/2013 | Klimecki | G05G 1/105 | 74/553 |
| 2013/0242531 | A1 * | 9/2013 | Urayama | G05G 1/105 | 362/23.22 |
| 2013/0270251 | A1 * | 10/2013 | Furuti | F24C 7/083 | 219/445.1 |
| 2013/0271950 | A1 * | 10/2013 | Park | F21V 3/049 | 362/23.07 |
| 2014/0056022 | A1 * | 2/2014 | Camli | G05G 1/10 | 362/551 |
| 2014/0085918 | A1 * | 3/2014 | Muller | B60Q 3/51 | 362/514 |
| 2014/0198476 | A1 * | 7/2014 | Ikeuchi | H01H 13/023 | 362/23.05 |
| 2014/0204557 | A1 * | 7/2014 | Cadima | F21V 33/0044 | 362/23.07 |
| 2014/0315510 | A1 * | 10/2014 | Heng | F21V 33/0056 | 455/347 |
| 2015/0107462 | A1 * | 4/2015 | Moro | F23N 5/102 | 99/332 |
| 2015/0122134 | A1 * | 5/2015 | Moro | F23N 1/007 | 99/332 |
| 2015/0153047 | A1 * | 6/2015 | Moro | F23N 5/203 | 99/332 |
| 2015/0299931 | A1 * | 10/2015 | Yang | D06F 39/005 | 362/23.19 |
| 2018/0010932 | A1 * | 1/2018 | Bach | G01D 5/3473 | |
| 2018/0130628 | A1 * | 5/2018 | Udo | H01H 19/14 | |
| 2018/0232001 | A1 * | 8/2018 | Gur | H01H 9/161 | |
| 2018/0245795 | A1 * | 8/2018 | Serabatir | F24C 3/124 | |
| 2018/0301301 | A1 * | 10/2018 | Bach | H03K 17/941 | |
| 2019/0126819 | A1 * | 5/2019 | Schubert | B60Q 3/10 | |

FOREIGN PATENT DOCUMENTS

| | | | |
|---|---|---|---|
| JP | 11-8053 | | 1/1999 |
| JP | 2009-14235 | | 1/2009 |
| JP | 200914235 | * | 1/2009 |
| KR | 2002-0022962 | | 3/2002 |
| WO | 2015/003730 | | 1/2015 |

OTHER PUBLICATIONS

Extended European Search Report dated May 23, 2019 in European Patent Application No. 17839769.1.
Chinese Office Action dated Dec. 18, 2019 from Chinese Patent Application No. 201780049190.8, 12 pages.

* cited by examiner

COOKING APPLIANCE

CROSS-REFERENCE TO RELATED APPLICATIONS

This application claims the priority benefit of Korean Patent Application No. 10-2016-0101847, filed on Aug. 10, 2016 in the Korean Intellectual Property Office, the disclosure of which is incorporated herein by reference in its entirety.

BACKGROUND

1. Field

The disclosure relates to a knob assembly used for operating a cooking appliance and a cooking appliance including the same.

2. Description of the Related Art

A cooking appliance cooks food using gas or electricity. The cooking appliance may include a cabinet forming an exterior, and a cooktop unit located in an upper portion of the cabinet. The cooktop unit may include a heating source such as an induction range or gas range.

The cooking appliance may include an oven in which food is placed in the internal space of the cabinet and food is cooked by receiving power from the outside. The oven may be located at the bottom of the cooktop unit.

Such a cooking appliance may include a knob assembly for setting various conditions necessary for cooking or for controlling the operation of the cooking appliance.

A conventional knob assembly is not easy to identify the operating condition of a cooking appliance when the external illuminance is low or when the user is far away from the cooking appliance.

SUMMARY

An aspect of the disclosure provides a knob assembly to emit light to the outside and a cooking appliance including the knob assembly.

Another aspect of the disclosure provides a cooking appliance that the user can easily confirm the operation state of the cooking appliance even when the external illuminance is low or the user is far from the cooking appliance.

Another aspect of the disclosure provides a cooking apparatus with improved user friendliness and aesthetics.

Additional aspects of the disclosure will be set forth in part in the description which follows and, in part, will be apparent from the description, or may be learned by practice of the disclosure.

In accordance with an aspect of disclosure, a cooking appliance includes a main body having at least one heating source, a panel disposed in the main body and provided with a through hole, and a knob assembly coupled to the panel, wherein the knob assembly includes a knob, at least one light source configured to emit light, a first light guide passing through the through hole and arranged to guide light emitted from the light source, and a second light guide configured to guide the light guided by the first light guide to the outside of the knob.

The knob may further include a guide hole penetrating at least a portion of the knob, and a portion of the second light guide may be fitted into the guide hole.

The guide hole may be formed across a top surface and a side surface of the knob.

The first light guide may include a coupling groove, and at least a portion of the second light guide may be coupled to the coupling groove.

The second light guide may include a portion whose cross-sectional area increases in a direction in which light is guided.

The cooking appliance may further include a control module including a shaft and configured to control the heating source, wherein the knob may include a shaft housing coupled with the shaft to be rotated with the shaft.

The shaft housing may include a rotation preventing protrusion to prevent relative rotation between the knob and the shaft, and the shaft may include a rotation preventing groove corresponding to the rotation preventing protrusion.

The first light guide may extend in a direction of a rotation axis of the knob and include an insertion hole into which the shaft and the shaft housing are inserted.

The cooking appliance may further include a sealing member disposed between the light source and the panel to prevent moisture from penetrating into the light source.

In accordance with an aspect of disclosure, a cooking appliance include a main body, a panel disposed in the main body and provided with a through hole, and a knob assembly coupled to the panel, wherein the knob assembly includes a knob, at least one light source configured to emit light, a light guiding cylinder configured to guide the light emitted from the light source to pass through the through hole, at least a portion of the light guiding cylinder passing through the through hole, and a light guiding plate configured to guide the light guided by the light guiding cylinder to the outside of the knob.

The cooking appliance may further include a shaft passing through the through hole and coupled with the knob, wherein the shaft may pass through the light guiding cylinder and the light guiding plate.

The knob may include a first surface facing the panel, and the light guiding plate may be coupled to the first surface.

A rim of the first surface may protrude toward the panel so that the light guiding plate is fitted to the first surface.

The knob assembly may further include a sealing member disposed between the light guiding cylinder and the light source to prevent moisture from penetrating into the light source.

The light guiding cylinder and the light guide plate may be integrally formed.

In accordance with an aspect of disclosure, a knob assembly include a knob, at least one light source configured to emit light, a first light guide arranged to guide the light emitted from the light source, and a second light guide configured to guide the light guided by the first light guide to the outside of the knob.

The knob may include a guide hole penetrating at least a portion of the knob, and a portion of the second light guide may be inserted into the guide hole.

The guide hole may be formed across a top surface and a side surface of the knob.

The first light guide may include a coupling groove, and at least a portion of the second light guide may be coupled to the coupling groove.

The second light guide may include a portion whose cross-sectional area increases in a direction in which light is guided.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
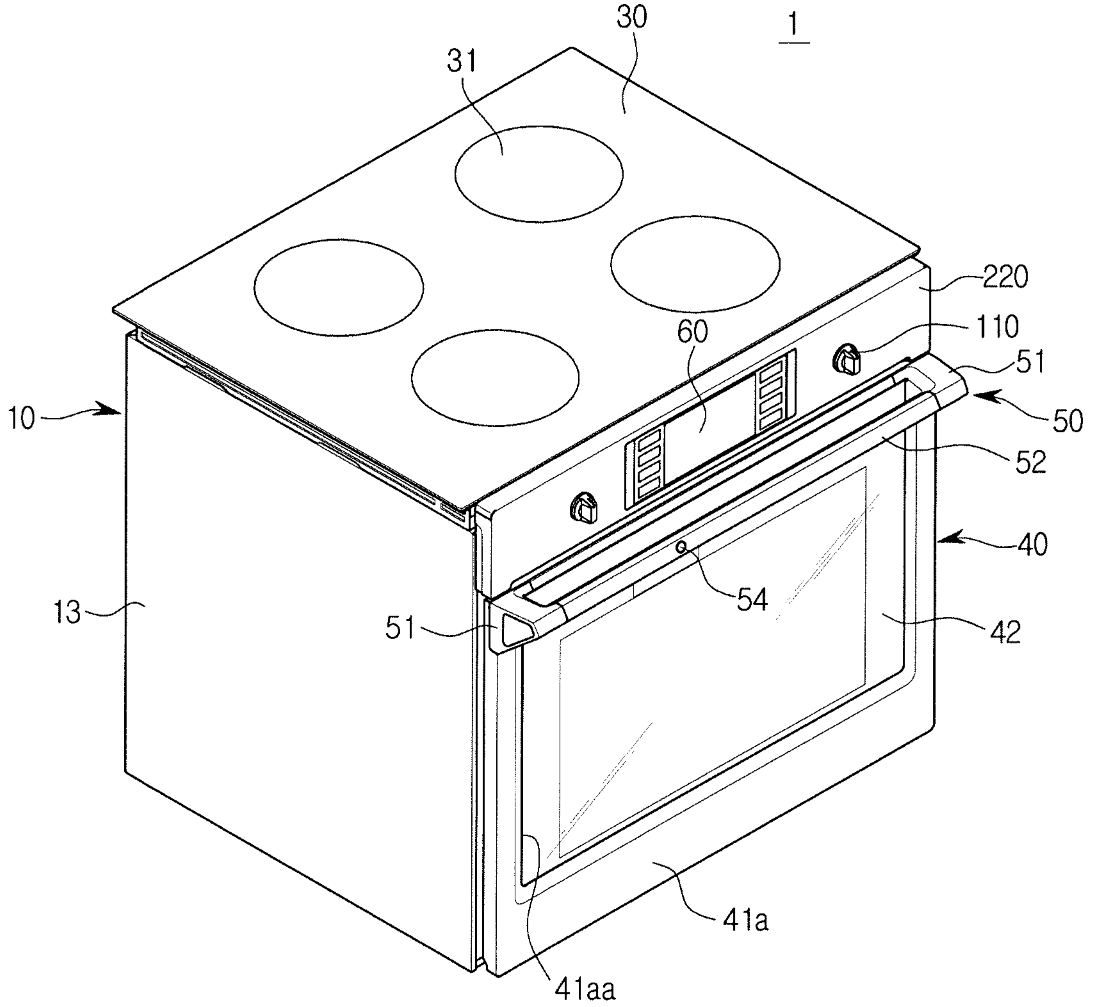
FIG. 1 is a perspective view showing an appearance of a cooking appliance according to an embodiment of the disclosure.

Hereinafter, embodiments according to the disclosure will be described in detail with reference to the accompanying drawings, wherein like reference numerals refer to like elements throughout. The embodiments are described below to explain the disclosure by referring to the figures.

A front surface and a front direction used in the following description refer to a face and a direction of the cooking appliance 1, which look ahead, respectively, as shown in FIG. 1, and a rear direction refers to a direction of the cooking appliance 1 that looks back.

Figure 2:
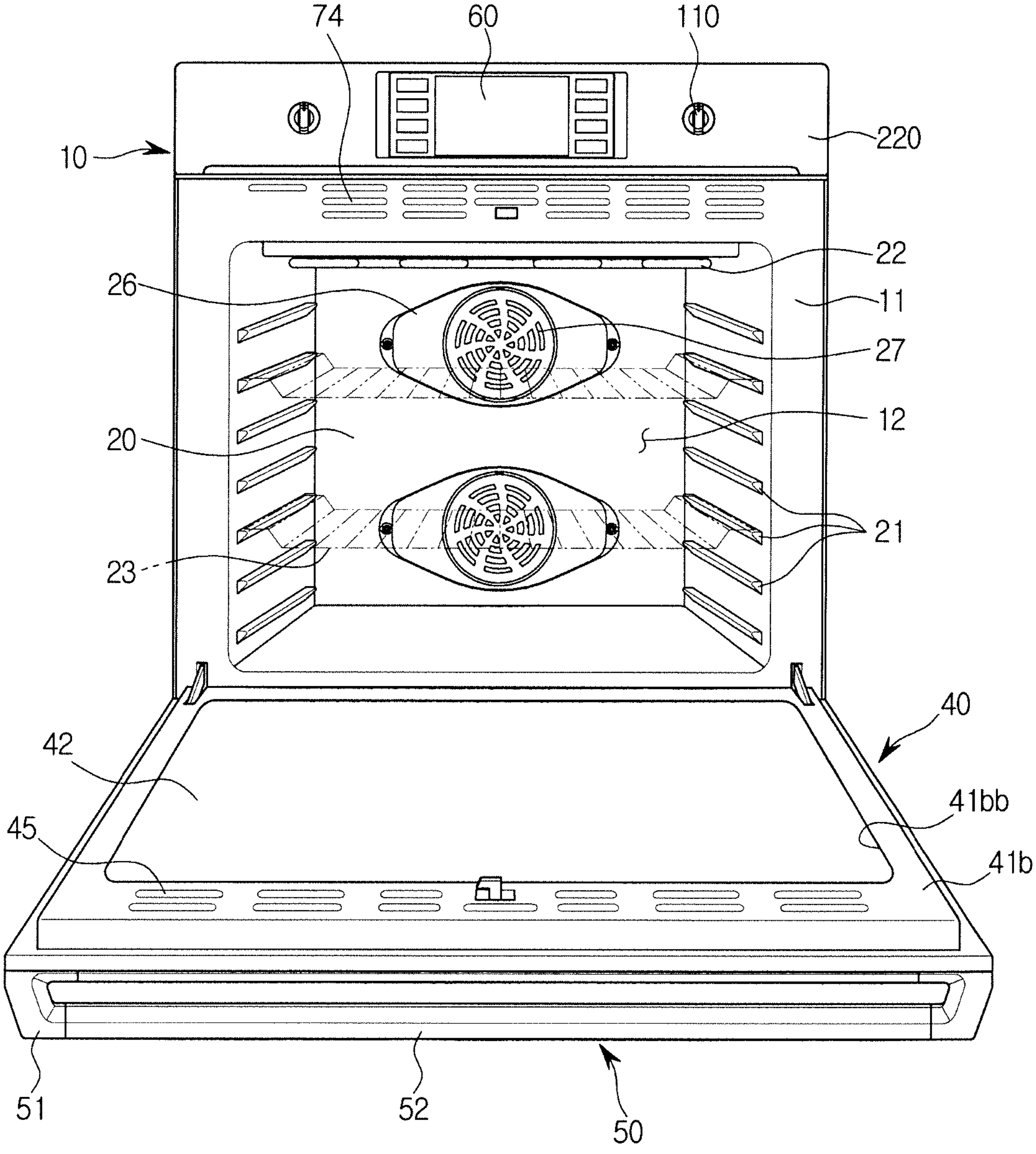
FIG. 2 is a view showing a state in which a door of a cooking appliance according to an embodiment of the disclosure is opened.
Figure 3:
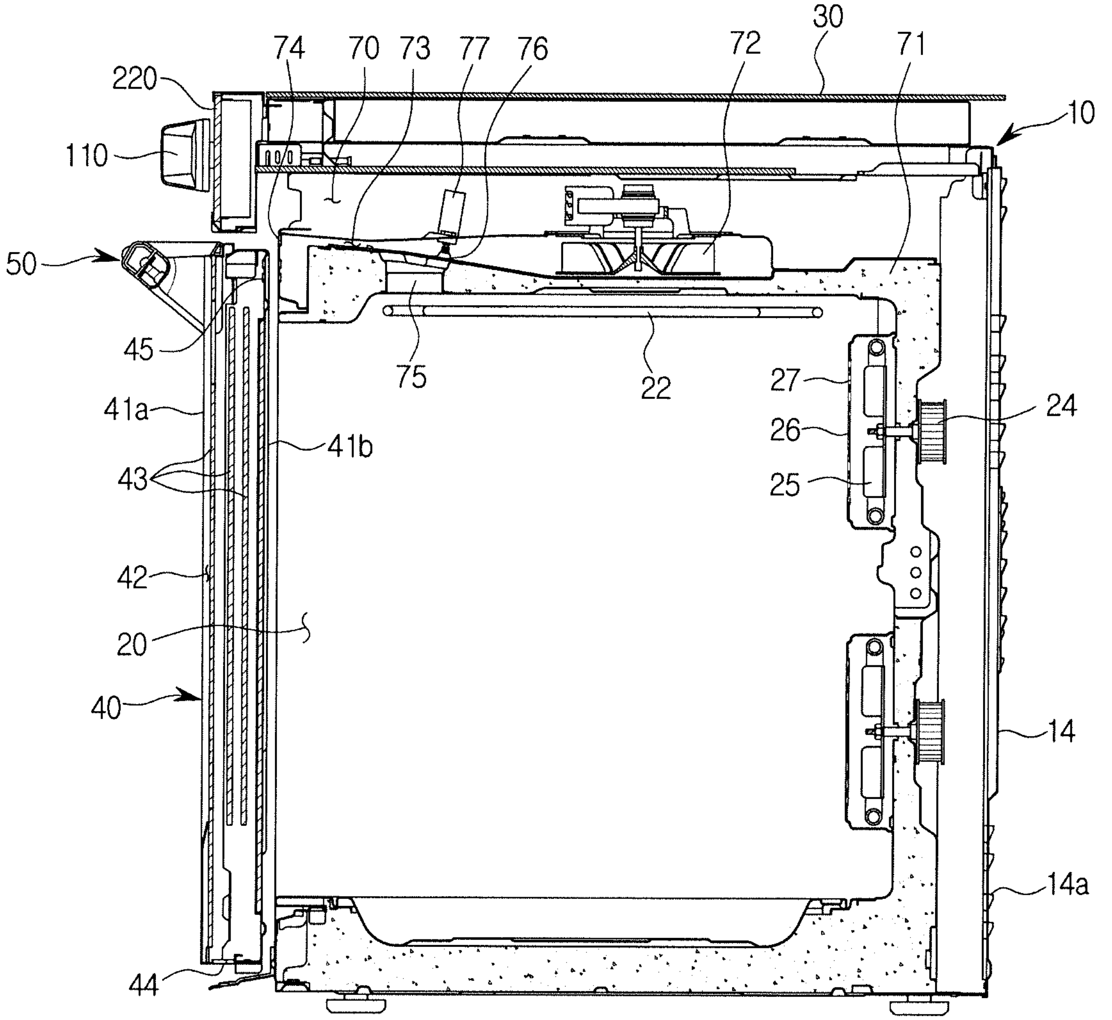
FIG. 3 is a side cross-sectional view of the cooking appliance according to an embodiment of the disclosure.

FIG. 1 is a perspective view showing an appearance of a cooking appliance according to an embodiment of the disclosure. FIG. 2 is a view showing a state in which a door of a cooking appliance according to an embodiment of the disclosure is opened. FIG. 3 is a side cross-sectional view of the cooking appliance according to an embodiment of the disclosure.

As shown in FIG. 1 to FIG. 3, a cooking appliance 1 may include a main body 10 forming the exterior, a cooking chamber 20 located inside the main body 10, and a cooktop 30 provided on the top of the cooking appliance 1 and capable of heating a container of food placed thereon.

At least one heating zone 31 may be provided in the cooktop 30. The container of food may be placed in the heating zone 31 and heated directly. The heating zone 31 is provided with a heating source arranged with a coil wound up several times to heat the container of food. The heating source may be a gas burner or a petroleum burner instead of a heating coil which is a heating element using electricity. The cooking appliance 1 according to an embodiment of the disclosure may include an induction range, a heating coil, a gas burner, and a petroleum burner as a heating source.

The main body 10 may include a front panel 11 forming the front surface of the main body 10, side panels 13 forming side surfaces of the main body 10, and a rear panel 14 forming the rear surface of the main body 10.

The cooking chamber 20 is provided inside the main body 10 in the form of a box, and a front surface thereof may be opened so that food is put in or taken out. The front panel 11 may be provided with an opening 12 corresponding to the cooking chamber 20 with the front open. The opened front surface of the cooking chamber 20 may be opened or closed by a door 40.

A plurality of support rods 21 may be provided in the cooking chamber 20. Racks 23 allowing an object to be cooked to be put thereon may be mounted on the plurality of support rods 21. The plurality of support rods 21 may be provided to protrude from the left side wall and the right side wall of the cooking chamber 20.

A divider (not shown) capable of dividing the cooking chamber 20 may be detachably mounted on the plurality of support rods 21. Specifically, the divider (not shown) is mounted horizontally in the cooking chamber 20 to divide the cooking chamber 20 into a plurality of chambers.

The plurality of cooking chambers 20 need not have the same size, but may have different sizes. The divider may include a heat insulating to insulate each cooking chamber 20. Accordingly, the cooking chamber 20 may be utilized in various ways according to the intention of the user.

The cooking chamber 20 may be provided with a heater 22 for heating food. The heater 22 may be an electric heater including an electric resistor. Alternatively, the heater 22 may be a gas heater that generates heat by burning gas. The cooking appliance 1 according to an embodiment of the disclosure may include an electric oven or a gas oven as a heating source.

A circulation fan 25 to circulate the air in the cooking chamber 20 to heat food evenly and a circulation motor 24 to drive the circulation fan 25 may be provided in the rear of the cooking chamber 20. A fan cover 26 covering the circulation fan 25 may be provided in front of the circulation fan 25. A through hole 27 may be formed in the fan cover 26 to allow air to flow in and out.

The door 40 may be pivotally hinged at the lower edge of the main body 10. Alternatively, although not shown, the door 40 may be hinged at the left or right edge of the main body 10.

The door 40 may include a transparent portion 42 made of a transparent material such as glass so that the cooking process of the inside of the cooking chamber 20 is checked from the outside. The door 40 may include a front door frame 41_a_ and a rear door frame 41_b_ provided along the edges of the transparent portion 42. The front door frame 41_a_ may include a front frame opening 41_aa_ for forming the transparent portion 42 and the rear door frame 41_b_ may include a rear frame opening 41_bb_.

A plurality of glass members 43 may be provided inside the door 40. In order to allow the inside of the cooking chamber 20 to be seen through the transparent portion 42, the transparent portion 42 may be formed of a transparent member in addition to the plurality of glass members 43.

At the lower end of the door 40, a door suction port 44 capable of sucking air into the inside of the door 40 may be provided. The outside air introduced from the lower end of the door 40 may exchange heat with heated air transferred from the cooking chamber 20 while moving to the upper side of the door 40, and may then be discharged through the door discharge port 45 provided in the rear door frame 41*b* located at the rear of the door 40. With the configuration, the cooking appliance in accordance with the disclosure may cool the heat inside the door 40 by circulating the air.

A handle 50, which is arranged to be held by the user, may be provided at the upper end of the front surface of the door 40 so that the door 40 is easily opened or closed. When the door 40 is hinged at the left or right edge of the main body 10, the handle 50 may be provided on the right or left side of the front surface of the door 40 correspondingly.

The handle 50 may protrude forward from the front surface of the door 40 by a predetermined length. The handle 50 may include a pair of handle support portions 51 extending forward from the front surface of the door 40 and a handle extension portion 52 connecting the pair of handle support portions 51.

A display module 60 may be provided on the top front of the front panel 11 to display various kinds of operation information of the cooking appliance 1 and to input an operation command by a user. The display module 60 may be mounted on the electric room cover. Hereinafter, the electric room cover refers to the panel 220.

The panel 220 may be disposed on at least a portion of the main body 10. According to an embodiment of the disclosure, the panel 220 may be disposed on one side of the front surface of the main body 10. The disclosure is not limited to this, and the panel 220 may be disposed on the upper surface of the main body 10, or the panel 220 may form a side of the main body 10.

The knob assembly 100 may be provided on the electric room cover to additionally operate the cooking appliance 1.

The cooking appliance 1 may have an electric room 70 for containing electric components for controlling the operation of various accessories including the display module 60. The electric room 70 may be provided on the upper portion of the cooking chamber 20. A heat insulating material 71 to insulate the electric room 70 and the cooking chamber 20 is provided between the electric room 70 and the cooking chamber 20 to prevent the heat of the cooking chamber 20 from being transferred to the electric room 70.

The heat insulating material 71 may be provided to cover the entire outside of the cooking chamber 20 to block the heat of the cooking chamber 20 from being transferred to the outside of the cooking appliance 1 as well as the electric room 70 and the cooking chamber 20.

The cooking appliance 1 may have a cooling structure to cool the electric room 70 by circulating air around the cooking chamber 20. The cooling structure of the cooking appliance 1 may include a cooling fan unit 72 to flow air and a cooling channel 73 to discharge the air sucked in by the cooling fan unit 72 to the front of the cooking appliance 1.

The air outside the main body may be sucked into the electrical room 70 through the through hole 14*a* formed in the rear panel 14. The air sucked into the electrical room 70 may flow inside the electrical room 70 to cool the electric components, and then may be finally discharged to the front of the cooking appliance 1 through the discharge port 74 along the cooling channel 73.

Some of the air in the cooking chamber 20 may be sucked into the cooling channel 73 through the exhaust channel 75 and discharged to the front of the cooking appliance 1.

Hereinafter, the knob assembly 100 of the cooking apparatus 1 will be described in detail.

Figure 4:
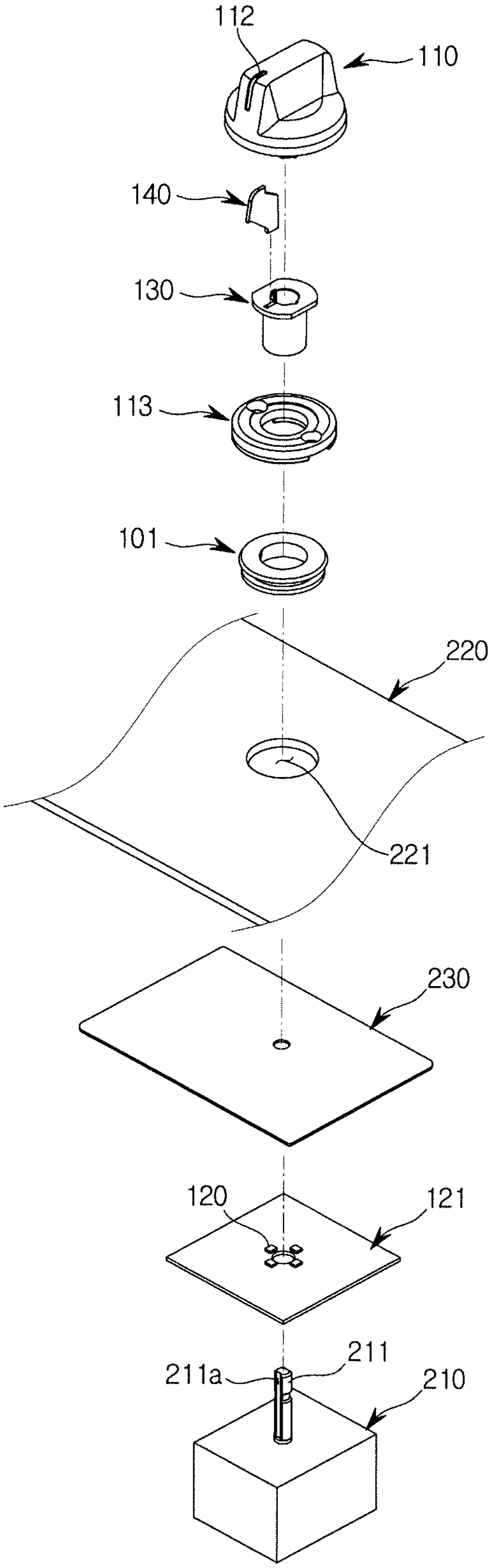
FIG. 4 is an exploded perspective view of a knob assembly in a cooking appliance according to an embodiment of the disclosure.
Figure 5:
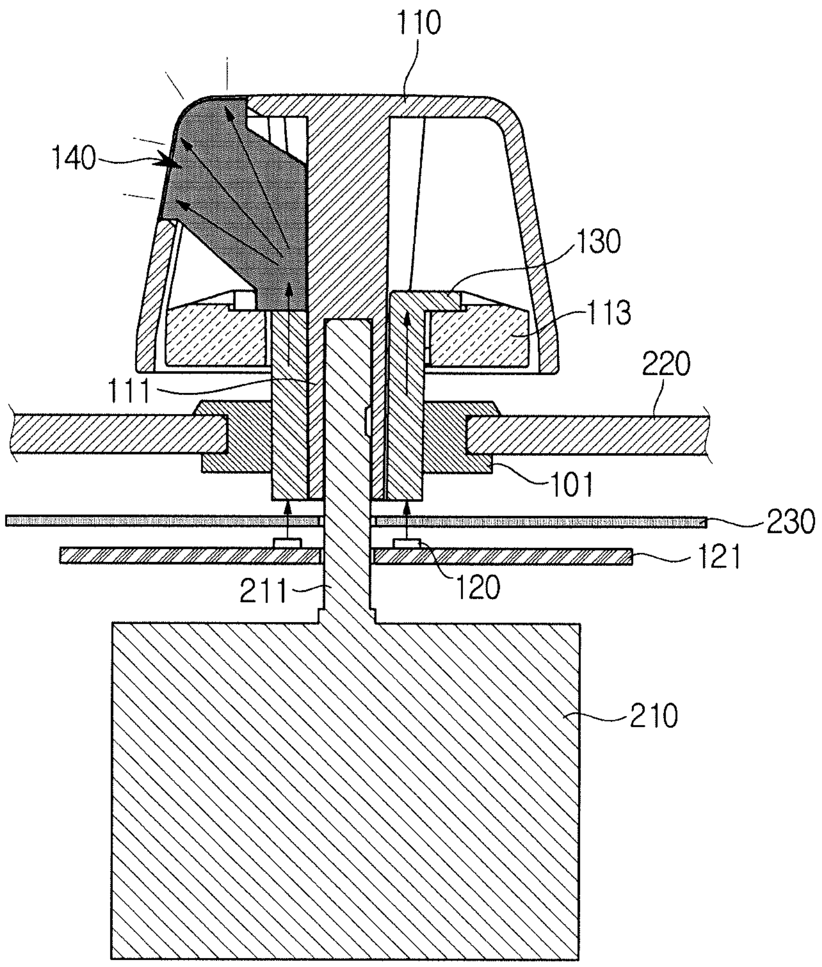
FIG. 5 is a side cross-sectional view of a knob assembly shown in FIG. 4.
Figure 6:
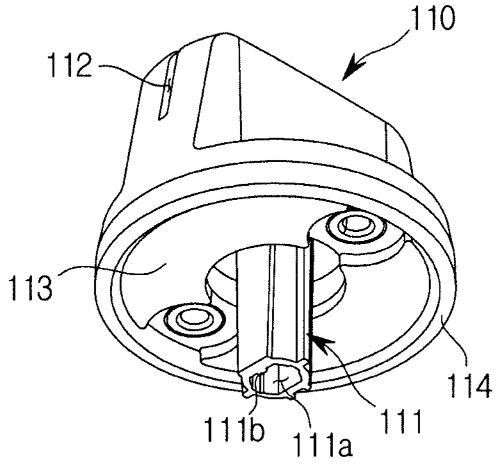
FIG. 6 is a bottom view of a knob shown in FIG. 4.

FIG. 4 is an exploded perspective view of a knob assembly in a cooking appliance according to an embodiment of the disclosure. FIG. 5 is a side cross-sectional view of the knob assembly shown in FIG. 4. FIG. 6 is a bottom view of the knob shown in FIG. 4. FIG. 7 is a view showing the first light guide and the second light guide shown in FIG. 4. FIG. 8 is a view showing the operation of the knob assembly shown in FIG. 4.

As shown in FIG. 4 and FIG. 5, the knob assembly 100 according to an embodiment of the disclosure may include a knob 110, at least one light source 120 that emits light, a first light guide 130 for guiding the light emitted from the light source 120 into the knob 110, and a second light guide 140 for guiding the light guided by the first light guide 130 to the outside of the knob 110.

Hereinafter, a Light Emitting Diode (LED) will be described as an example of the light source that emits light.

The knob 110 may include a cylindrical portion provided in a substantially cylindrical shape and a grip portion protruded from the cylindrical portion. The grip portion may be provided in a substantially hexahedral shape. The user may easily rotate the knob 110 while holding the protruding grip portion by hand.

The gripping portion may include a top surface 110*a* and four side surfaces 110*b*, 110*c*, 110*d*, and 110*e* extending from the edges of the top surface 110*a* toward a circular portion. The two side surfaces 110*b* and 110*c* of the four sides of the grip portion may be provided in a substantially trapezoidal shape and the remaining two sides 110*d* and 110*e* may be provided in a substantially rectangular shape. Hereinafter, the top surface and the side surface of the grip portion refer to a top surface and a side surface of the knob 110, respectively. In addition, depending on the direction in which the panel 220 is coupled to the main body 10, the top surface may point to the front of the knob. For example, when the panel 220 is coupled to the front surface of the body 10, the top surface may refer to the front surface of the knob.

The knob 110 may include a guide hole 112. The guide hole 112 may penetrate at least a portion of the knob 110. The knob 110 may be formed to have an empty space inside and the empty space inside the knob 110 may be seen from outside of the knob 110 through the guide hole 112.

The guide hole 112 is provided to divert the light guided by the second light guide 140 to the outside of the knob 110. At least a portion of the second light guide 140 may be inserted into the guide hole 112. The portion of the second light guide 140 may be exposed to the outside of the knob 110 through the guide hole 112 and the remaining portion may be disposed inside the knob 110. The portion of the second light guide 140 disposed inside the knob 110 may be coupled to a coupling groove 131 of the first light guide 130.

The guide hole 112 may extend across the top surface 110*a* and the side surface 110*d* of the knob 110. Specifically, the guide hole 112 may be formed across two sides of the knob 110, not on only one side. Thereby, the user may see the light guided through the second light guide 140 from various angles. The user may recognize the light emitted to the outside of the knob 110 on the side surfaces as well as on the front surface of the cooking appliance 1.

The knob assembly 100 may further include a control module 210 including a shaft 211 and configured to control the heating source of the cooking appliance 1.

The shaft 211 may be rotatably coupled to the control module 210. As the shaft 211 rotates, the control module 210 may control the operation of the heating source. The control module 210 may receive a degree of rotation of the shaft 211 and control the heating source. For example, the control module 210 may control on/off and temperature of the heating zone 31 of the cooktop 30 and control on/off, temperature, cooking time, cooking mode, etc. of the heater 22.

The knob 110 may be coupled to the shaft 211 of the control module 210. The knob 110 may be coupled to the shaft to be rotated with the shaft 211. The knob 110 and the shaft 211 may be coupled so as not to be relatively rotated to each other. This will be described later.

As shown in FIG. 5, the LED 120 may be disposed between the knob 110 and the control module 210. The LED 120 may be disposed inside the panel 220. In addition, the LED 120 may be disposed between the panel 220 and the control module 210.

The LED 120 may be mounted on a printed circuit board 121 having a hollow through which the shaft 211 may pass. In addition, the LED 120 may be disposed on the printed circuit board 121 so as to be spaced along the circumference of the shaft 211. According to an embodiment of the disclosure, four LEDs 120 may be provided, but this is only an example and the number of the LEDs 120 may be changed to as many as necessary.

The LED 120 may be supplied with electric power through the printed circuit board 121. The printed circuit board 121 may be connected to a power supply unit (not shown) provided inside the main body to receive power. Alternatively, the printed circuit board 121 may be connected to the control module 210 to receive power from the control module 210.

The knob assembly 100 may include a first light guide 130 that guides light emitted from the LED 120 to the inner side of the knob 110.

The first light guide 130 may extend in the direction of the rotation axis of the knob 110. At least a portion of the first light guide 130 may pass through the through hole 221. This may allow the first light guide 130 to guide the light emitted from the LED 120 to pass through the through hole 221. The light passing through the through hole 221 by the first light guide 130 may be guided to the second light guide 140. The first light guide 130 may guide the light emitted from the LED 120 to the second light guide 140.

The light emitted from the LED 120 may first be directly incident on the first light guide 130. According to an embodiment of the disclosure, a sealing member 230 may be disposed between the first light guide 130 and the LED 120. The light emitted from the LED 120 may be incident on the first light guide 130 through the sealing member 230. Details of the sealing member will be described later.

The second light guide 140 may guide the light guided by the first light guide 130 to the outside of the knob 110. A portion of the second light guide 140 may be fitted into the guide hole 112. The portion of the second light guide 140 may be exposed to the outside of the knob 110 through the guide hole 112 and the remaining portion may be disposed inside the knob 110.

The first light guide 130 may guide the light transferred from the LED 120 to the inside of the knob 110. The first light guide 130 may guide the light emitted from the LED 120 to the second light guide 140 disposed inside the knob 110. The second light guide 140 may guide light guided by the first light guide 130 to the second light guide 140 to the outside of the knob 110 through the guide hole 112.

The second light guide 140 may include a portion whose cross-sectional area increases along a direction in which the light is guided. The length of the second light guide 140 in a direction perpendicular to the rotation axis of the knob 110 may increase in one section, decrease in another section, and be constant in another section. The length of the second light guide 140 in the direction perpendicular to the rotation axis of the knob 110 may be constant in the first section, increase in the second section, and decrease in the third section. Specifically, the length of the second light guide 140 in the direction perpendicular to the rotation axis of the knob 110 may be constant in the section from an incident surface 141 to one end of a connecting portion 143 of the second light guide 140. The length of the second light guide 140 in the direction perpendicular to the rotation axis of the knob 110 may increase in the section from the one end of connecting portion 143 to an exit surface 142 of the second light guide 140. The length of the second light guide 140 in the direction perpendicular to the rotation axis of the knob 110 may decrease in the section from the exit surface 142 to the end of the second light guide 140. In other words, the length in the direction perpendicular to a path of the light in the second light guide 140 may increase in one section and decrease in the other section.

The first light guide 130 and the second light guide 140 may be formed of a transparent injection molded acryl including PMMA. The first light guide 130 and the second light guide 140 may be made of the same material or may be made of different materials.

The knob assembly 100 may further include a knob base 113 coupled to the bottom of the knob 110 to form a portion of the bottom of the knob 110, a grommet 101 provided to stably support the knob 110 on the panel 220, and a sealing member 230 disposed between the LED 120 and the panel 220 to prevent moisture penetration into the LED 120.

The knob base 113 may be coupled to the bottom of the knob 110 so that the first light guide 130 and the second light guide 140 may be fixed inside the knob 110. The first light guide 130 and the second light guide 140 may be coupled to the inside of the knob 110, and then the knob base 113 may be coupled to the bottom of the knob to prevent the first light guide 130 and the second light guide 140 from falling down from the knob 110.

The grommet 101 may reduce a gap between the through hole 221, the knob 110, and the first light guide 130. The grommet 101 may be made of a rubber material. The grommet 101 may be disposed between the through hole 221 and the first light guide 130. The grommet 101 may be provided to surround the outer periphery of the first light guide 130. The grommet 101 may primarily prevent water on the panel 220 from penetrating into the the panel 220 through the through hole 221.

The sealing member 230 may be disposed on the upper side of the LED 120. Water penetration into the LED 120 may be prevented primarily by the grommet 101 and secondarily by the sealing member 230. Therefore, it is possible to prevent water penetration doubly. The sealing member 230 may be disposed between the grommet 101 and the LED 120.

The sealing member 230 may include a hole at the center thereof so that the shaft 211 pass through the sealing member 230. The sealing member 230 may be provided in various forms. For example, the sealing member 230 may be provided as a thin plate. In addition, the sealing member 230 may be made of various materials capable of preventing the penetration of moisture. For example, it may include various materials such as silicon, plastic, rubber, and metal. Since the light emitted from the LED 120 needs to be incident on the first light guide 130 through the sealing member 230, the sealing member 230 may be made of a material capable of transmitting light. That is, the sealing member 230 may be made of a material having good light transmittance.

As shown in FIG. 6, the knob 110 may include a shaft housing 111. The shaft housing 111 may extend in the direction of the rotational axis of the knob 110.

The shaft housing 111 may include a shaft hole 111*a* into which the shaft 211 is inserted. A rotation preventing protrusion 111*b* may be provided inside the shaft hole 111*a*. The shaft 211 may include a rotation preventing groove 211*a* recessed along the axial direction to correspond to the rotation preventing protrusion 111*b*. When the shaft 211 is inserted into the shaft hole 111*a*, the rotation preventing protrusion 111*b* is fitted in the rotation preventing groove 211*a*, so that the knob 110 and the shaft 211 are not relatively rotated to each other. As the knob 110 rotates, the shaft 211 also rotates together, and the user may control the heating source through the control module 210 by rotating the knob 110.

Figure 7A:
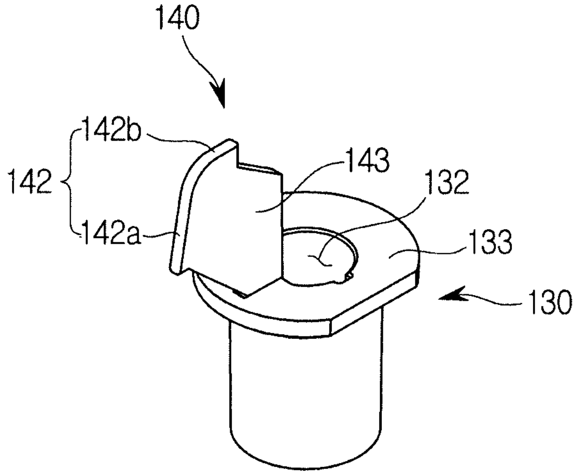
FIGS. 7A and 7B are views showing the first light guide and the second light guide shown in FIG. 4.
Figure 7B:
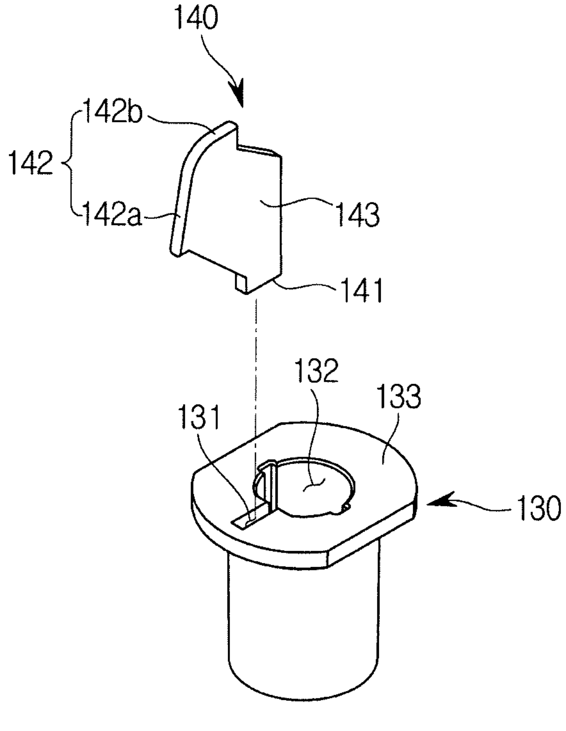

As shown in FIGS. 7A and 7B, the first light guide 130 may be formed in substantially a cylindrical shape having a hollow space. A flange 133 may be provided at one end of the first light guide 130, the cross-sectional area of which is wider than that of the other end of the first light guide 130.

A coupling groove 131 may be formed at one side of the flange 133. At least a portion of the second light guide 140 may be coupled to the coupling groove 131. The first light guide 130 and the second light guide 140 may be coupled by fitting at least a portion of the second light guide 140 into the coupling groove 131. The first light guide 130 and the second light guide 140 may be separately provided and then coupled to each other. This is for facilitating assembling of the first light guide 130 and the second light guide 140 in the knob 110, but the configuration is not limited thereto. The first light guide 130 and the second light guide 140 may be integrally formed.

The first light guide 130 may include an insertion hole 132. The shaft 211 and the shaft housing 111 may be inserted into the insertion hole 132.

As described above, the shaft 211 may be coupled to the shaft housing 111 not to be relatively rotated to the shaft housing 111. The shaft 211 may be inserted into the shaft hole 111*a* of the shaft housing 111. At least a portion of the shaft housing 111 may be inserted into the insertion hole 132 of the first light guide. A shaft housing 111 may be disposed outside the shaft 211 and a first light guide 130 may be disposed outside the shaft housing 111.

As shown in FIGS. 7A and 7B, the second light guide 140 may include an incident surface 141, a first exit surface 142*a*, a second exit surface 142*b*, and a connecting portion 143.

The light emitted from the LED 120 may be incident on the incident surface 141 of the second light guide 130 through the first light guide 130. The incident surface 141 may refer to a bottom surface of the second light guide 140. The incident surface 141 may be inserted into the coupling groove 131 of the first light guide 130.

The first exit surface 142*a* and the second exit surface 142*b* may be exposed to the outside of the knob 110 through the guide hole 112. The first exit surface 142*a* may be exposed to the side surface 110*d* of the knob 110. The second exit surface 142*b* may be exposed on the top surface 110*a* of the knob 110.

The light incident on the incident surface 141 may be emitted to the outside of the knob 110 through the first exit surface 142*a* and the second exit surface 142*b*.

The connecting portion 143 may be provided between the incident surface 141 and the exit surface 142. The cross-sectional area of the exit surface 142 may be larger than the cross-sectional area of the incident surface 141. The light incident on the incident surface 141 may be diffused in the connecting portion 143. The light diffused in the connecting portion 143 may be emitted to the outside of the knob 110 through the exit surface 142.

Figure 8A:
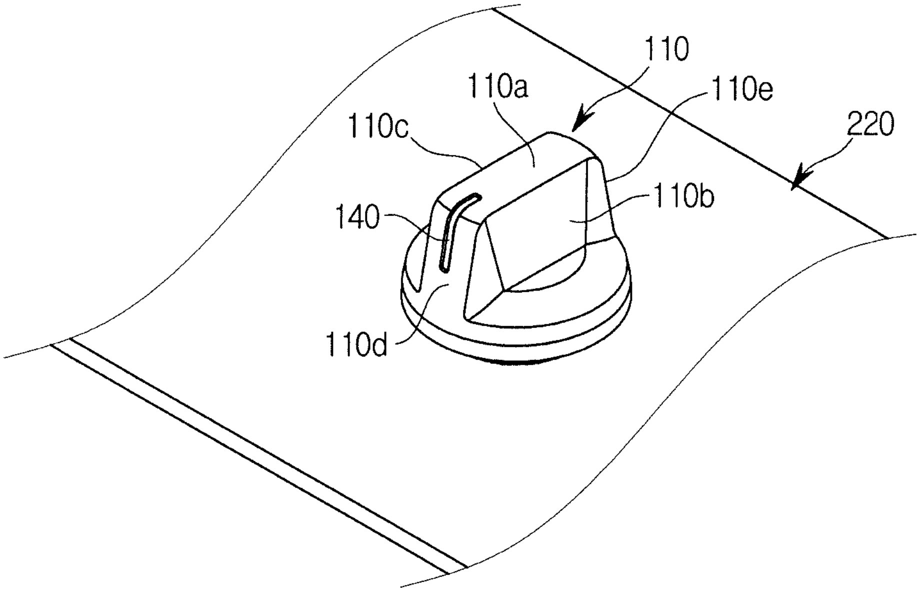
FIGS. 8A and 8B are views showing the operation of the knob assembly shown in FIG. 4.
Figure 8B:
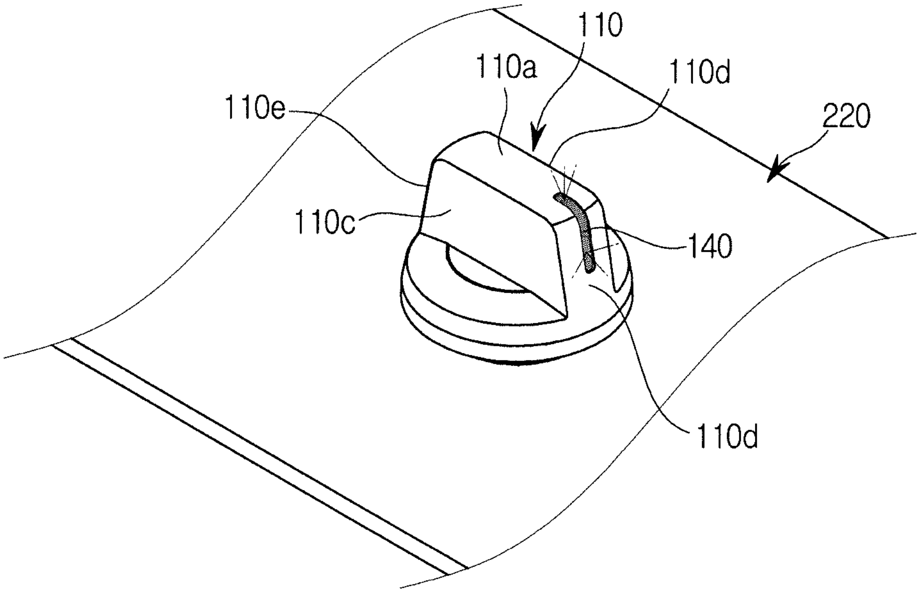

As shown in FIGS. 8A and 8B, the knob 110 according to an embodiment of the disclosure may emit light to the outside in accordance with the operation state of the cooking appliance 1. The knob 110 may not normally emit light to the outside. When the knob 110 is not rotated, the heating source does not perform the heating operation, and at this time, no light is emitted to the outside of the knob 110. When the knob 110 rotates, the shaft 211 rotates and enables the control module 210 to control the cooking device 1 as described above. By rotating the knob 110, the heating source of the cooking appliance 1 may be operated. In this case, the knob 110 may emit light to the outside so that the user may easily recognize that the heating source is operating. The user may easily check whether the heating source is operating even when the user is far from the cooking appliance 1 or the illuminance around the cooking appliance 1 is low. The light emitted from the knob 110 may give the cooking appliance 1 a luxurious feel. That is, the aesthetic feeling for the knob 110 may be be improved.

Figure 9:
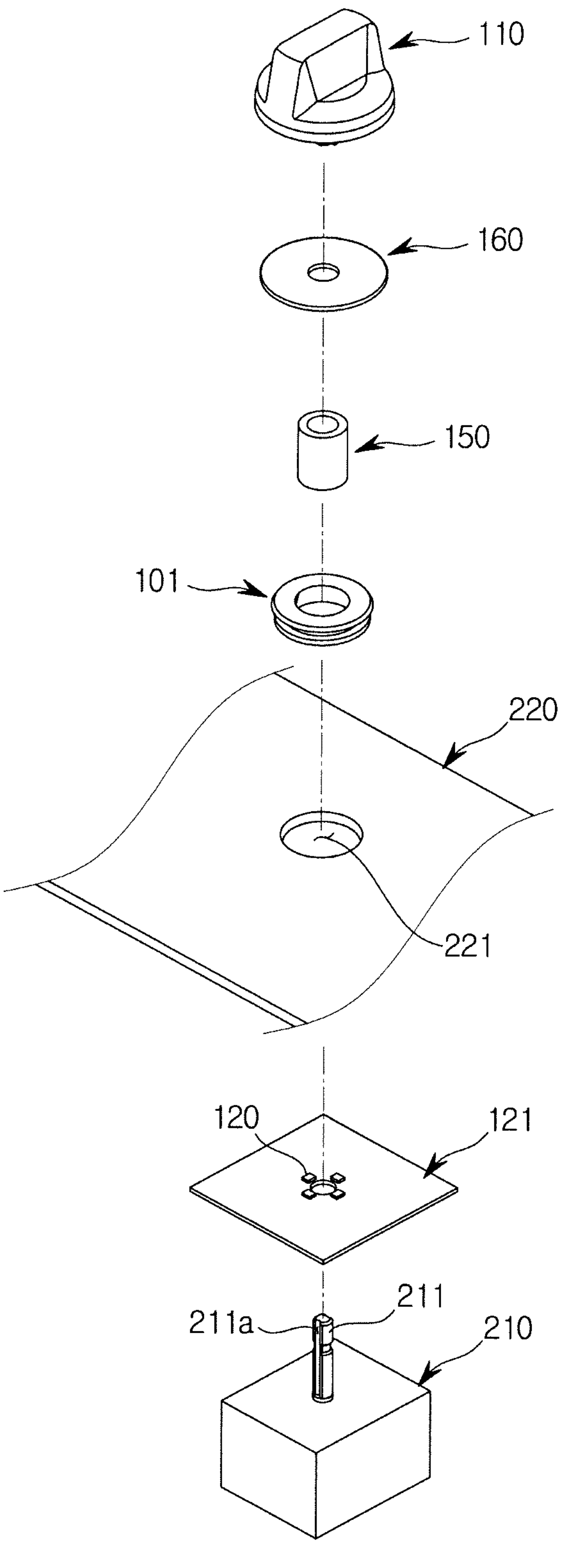
FIG. 9 is an exploded perspective view of a knob assembly in a cooking appliance according to another embodiment of the disclosure.
Figure 10:
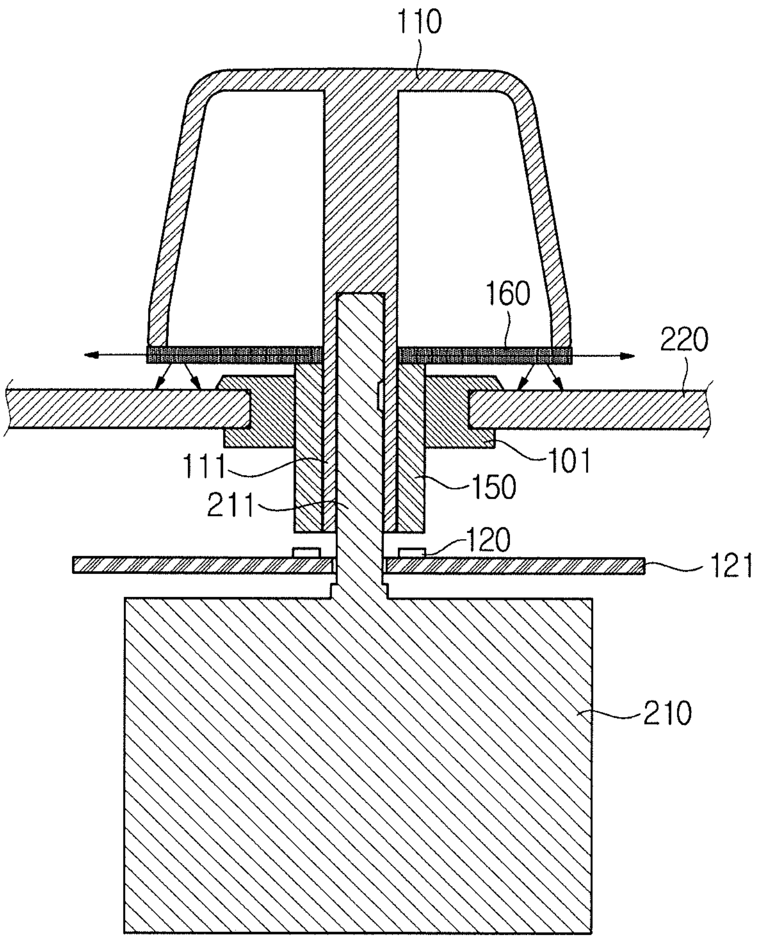
FIG. 10 is a side cross-sectional view of the knob assembly shown in FIG. 9.

FIG. 9 is an exploded perspective view of a knob assembly in a cooking appliance according to another embodiment of the disclosure and FIG. 10 is a side cross-sectional view of the knob assembly shown in FIG. 9.

Hereinafter, the description overlapping with the embodiment of the disclosure shown in FIGS. 4 to 8B will be omitted.

As shown in FIGS. 9 and 10, the knob assembly 100 according to another embodiment of the disclosure may include a knob 110, at least one LED 120 that emits light, and a light guiding cylinder 150 to guide the light emitted from the LED 120 to pass through a through hole 221 of a panel 220, and a light guide plate 160 to guide the light guided by the light guiding cylinder 150 to the outside of the knob 110.

According to another embodiment of the disclosure, the knob 110 may not include a guide hole. The knob 110 may emit light to the outside not through the guide hole but through the light guide plate 160 provided on the bottom surface of the knob 110. A detailed description thereof will be described later.

The light guiding cylinder 150 may be provided in the shape of a cylinder having a hollow. The shaft 211 and the shaft housing 111 may be inserted into the hollow of the light guiding cylinder 150. A grommet 101 may be disposed outside the light guiding cylinder 150. The grommet 101 may be disposed between the light guiding cylinder 150 and the through hole 221 to support the light guiding cylinder 150.

At least a portion of the light guiding cylinder 150 may pass through the through hole 221. The light guiding cylinder 150 may guide the light emitted from the LED 120 to pass through the through hole 221. Since the LED 120 is disposed inside the panel 220, the light emitted from the LED 120 may be guided to the outside of the panel 220 through the light guiding cylinder 150.

The light guiding plate 160 may be coupled to the bottom of the knob 110. The light guiding plate 160 may form the bottom surface of the knob 110.

The knob 110 may be provided such that the bottom is opened and the light guiding plate 160 may be coupled to the opened bottom of the knob 110. Alternatively, the knob 110 may have the bottom surface. At this time, the light guiding plate 160 may be attached to the bottom surface of the knob 110.

The light guiding plate 160 may be provided in the shape of a disk having a hole formed at its center. The light guide plate 160 may include a hole. The shaft housing 111 may be inserted into the hole of the light guiding plate 160. The light guiding plate 160 may be smaller than a circular portion of the knob 110. Therefore, when the knob 110 is viewed from outside, the light guiding plate 160 may not protrude out of the knob 110.

Hereinafter, operation of the knob assembly 100 according to another embodiment of the disclosure will be described in detail.

As shown in FIG. 10, the LED 120 may be disposed within the panel 220. Light emitted from the LED 120 may be directly incident on the light guiding cylinder 150. Although not shown in the drawings, a sealing member may be further included between the LED 120 and the panel 220, in which case the light emitted from the LED 120 may be incident on the light guiding cylinder through the sealing member.

The light incident on the light guiding cylinder 150 may pass through the through hole 221 by the light guiding cylinder 150. A light guiding plate 160 may be disposed on the top surface of the light guiding cylinder 150. The light incident on the light guiding cylinder 150 may be guided to the light guiding plate 160. The light guided by the light guiding plate 160 may be guided to the outside of the knob 110 or to the top surface of the panel 220.

Although not shown in the drawing, the light guiding cylinder 150 and the light guiding plate 160 may be integrally formed. The light guiding cylinder 150 and the light guiding plate 160 may be made of the same material. Alternatively, the light guiding cylinder 150 and the light guiding plate 160 may be made of different materials capable of guiding light.

When the knob 110 rotates and the heating source of the cooking appliance 1 operates, light may be emitted from the rim of the knob 110. The light may be emitted to the outside of the knob 110 through the light guiding plate 160. The light emitted from the light guiding plate 160 may be emitted from the knob 110 by being reflected off the top surface of the panel 220. From the light emitted from around the knob 110, the user may easily check whether the heating source is operating even at a far distance from the cooking appliance 1 or with low lighting around the cooking appliance 1. Furthermore, the emission of light from around the knob 110 may give improved esthetic feeling for the knob 110.

Figure 11:
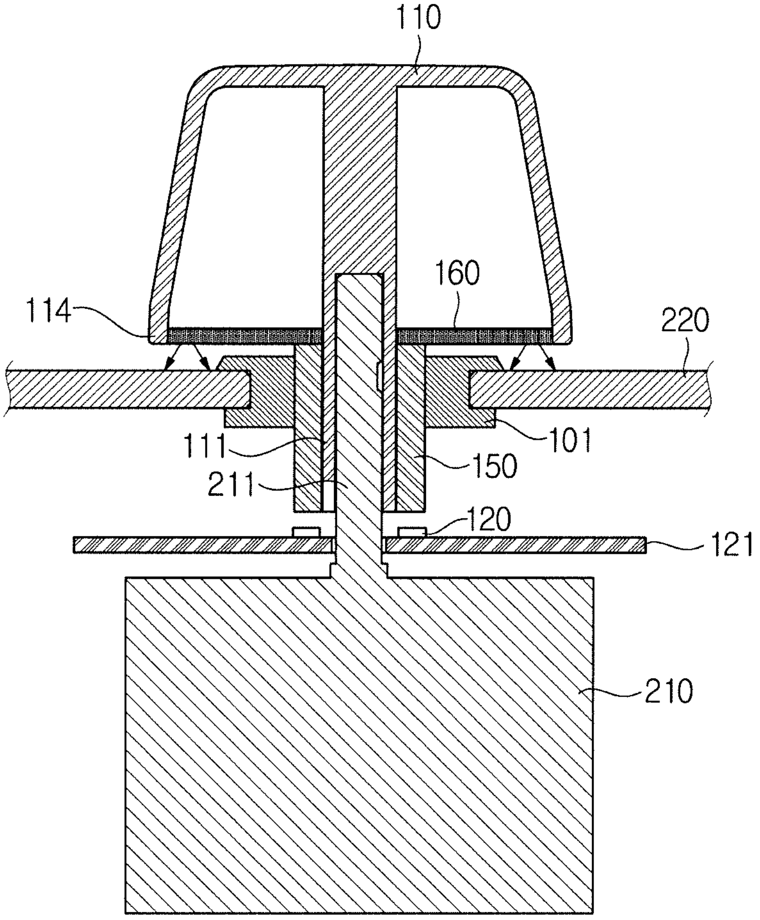
FIG. 11 is a side cross-sectional view of a knob assembly in a cooking appliance according to another embodiment of the disclosure.

FIG. 11 is a side cross-sectional view of a knob assembly in a cooking appliance according to another embodiment of the disclosure.

Hereinafter, the description of the contents overlapping with those described above with respect to the knob assembly will be omitted.

As shown in FIG. 11, the knob 110 may include a rim portion 114 protruding downward. The rim portion 114 may be formed on the bottom surface of the knob 110. The rim may be formed at the bottom edge of the knob 110 and may protrude in a direction in which the shaft housing 111 extends.

The rim 114 may enable the light guide plate 160 to be put into the bottom surface of the knob 110. The light guiding plate 160 may be coupled to the knob 110 by interference fit but may be coated with an adhesive on the contact surface between the lower surface of the knob 110 and the light guiding plate 160 to improve the coupling force. Alternatively, the light guiding plate 160 may be coupled to the bottom of the knob 110 to form the bottom surface of the knob 110. At this time, the light guiding plate 160 may be coupled with the rim 114 by interference fit. An adhesive may be applied between the rim portion 114 and the side surface of the light guiding plate 160 to improve the bonding force.

The light emitted from the LED 120 is guided to the light guiding plate 160 through the light guiding cylinder 150 and the light guiding plate 160 may guide the light to the top surface of the panel 220. In this case, compared to the embodiment shown in FIGS. 8A-8B and 9, the soft light may be emitted from the knob 110. The light guided by the light guiding plate 160 may be emitted not right away from the knob 110 but after being reflected off the panel 220, so the intensity of the light may be relatively weak. Therefore, the user may feel that the light emitted from the knob is soft. Recently, the number of users who prefer soft lighting is growing, so the lighting mechanism of the disclosure may appeal to the users' sentiments. That is, the aesthetic feel for the knob may be improved.

Figure 12:
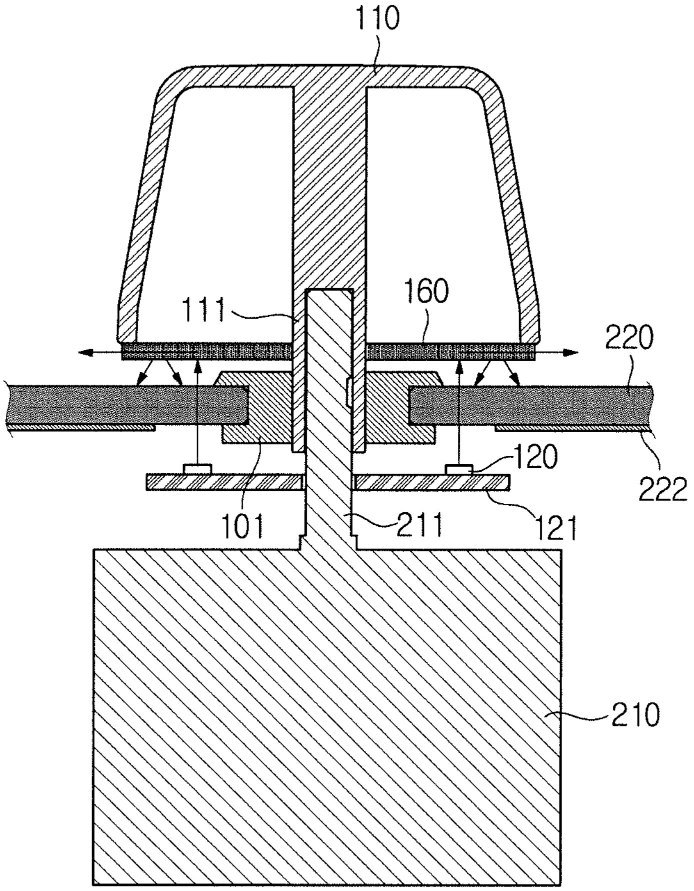
FIG. 12 is a side cross-sectional view of a knob assembly in a cooking appliance according to another embodiment of the disclosure.

FIG. 12 is a side cross-sectional view of a knob assembly in a cooking appliance according to another embodiment of the disclosure.

As shown in FIG. 12, the panel 220 may be made of a transparent material. The panel 220 may be made of a material that may be transparent to light. For example, the panel 220 may be made of glass.

The panel 220 may include a through hole 221 (see FIG. 9) and a print surface 222. The print surface 222 may be provided in an area other than the periphery of the through hole 221. That is, the print surface 222 may be provided not in the through hole 221 and its periphery, but in other areas. The through hole 221 and the peripheral portion thereof may refer to a region smaller than the bottom surface of the knob 110. Therefore, when the knob 110 is viewed from outside, only an area including the printed surface 222 may be seen. In other words, outside the panel 220, a transparent area that does not include the print surface 222 may not be visible. In addition, the inside of the panel 220 may not be seen from outside of the panel 220.

The LED 120 may be disposed inside the panel 220. The light emitted from the LED 120 may be incident on the light guiding plate 160 through the peripheries of the through holes 221. The light emitted from the LED 120 may be incident on the light guiding plate 160 through an area that does not include the print surface 222 of the panel 220.

The light incident on the light guiding plate 160 may be guided to the outside of the knob 110 and the top surface of the panel 220. Although FIG. 12 shows the knob 110 not including the rim portion, it is needless to say that the knob 110 may include a rim portion.

According to this embodiment of disclosure, since the knob assembly 100 does not include the light guide cylinder, the grommet 101 may be disposed between the shaft housing 111 and the through hole 221 to support the shaft housing 111. The embodiment is advantageous in that it may emit light to the outside of the knob 110 without including the light guiding cylinder, thereby saving costs.

Figure 13:
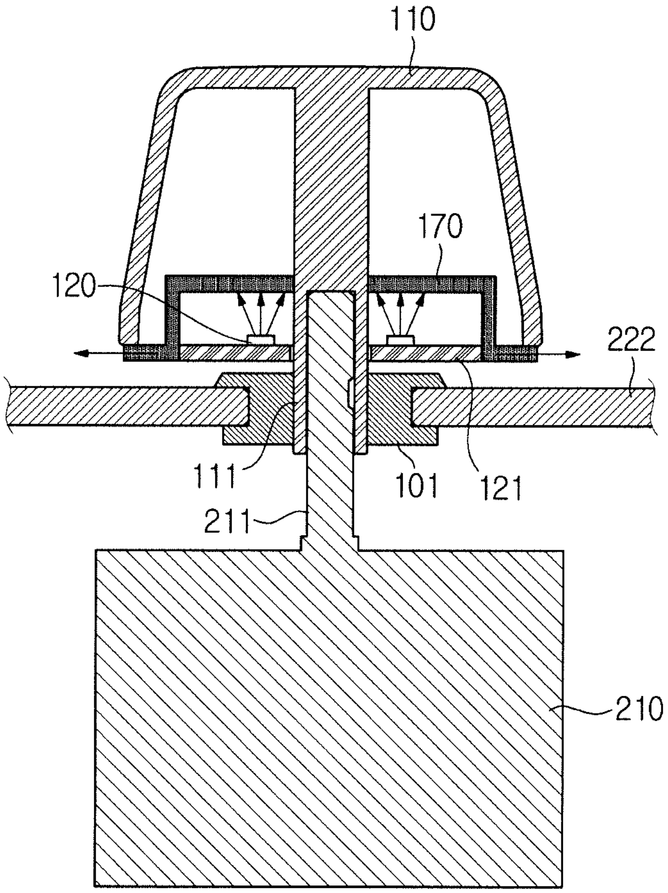
FIG. 13 is a side cross-sectional view of a knob assembly in a cooking appliance according to another embodiment of the disclosure.

FIG. 13 is a side cross-sectional view of a knob assembly in a cooking appliance according to another embodiment of the disclosure.

As shown in FIG. 13, the LED 120 may be disposed on top of the panel 220. In other words, the LED 120 may be disposed outside the panel.

The LED 120 may be disposed inside the knob 110. The printed circuit board 121 may be disposed on the bottom surface of the knob 110 for this purpose. Although not shown in the drawings, a sealing member may be provided in a space between the printed circuit board 121 and the grommet 101. Thus, it is possible to prevent the moisture on the surface of the panel 220 from penetrating into the printed circuit board 121.

The knob assembly 100 may include a light guide 170 disposed inside the knob 110.

The light guide 170 may guide the light emitted from the LED 120 to the outside of the knob 110. The light emitted from the LED 120 may be directly incident on the light guide 170. The light guide 170 may guide the light emitted by the LED 120 to the outside of the knob 110 and to the top surface of the panel 220.

Although embodiments of the disclosure have been shown and described, it would be appreciated by those skilled in the art that changes may be made to these embodiments without departing from the principles and spirit of the disclosure, the scope of which is defined in the claims and their equivalents.

What is claimed is:

1. A cooking appliance, comprising:
- a main body having at least one heating source;
- a panel disposed in the main body and provided with a through hole; and
- a knob assembly coupled to the panel, the knob assembly including:
  - a knob including a knob base having a through hole,
  - at least one light source configured to emit light,
  - a first light guide passing through the through hole of the knob base and arranged to guide the light emitted from the light source, the first light guide including a cylinder with a plate having a recessed opening, the plate extending from an end of the cylinder; and
- a second light guide partially inserted into the recessed opening in the first light guide and configured to guide the light guided by the first light guide to an outside of knob.

2. The cooking appliance according to claim 1, wherein the knob further includes a guide hole penetrating at least a portion of the knob, and a portion of the second light guide is fitted into the guide hole.

3. The cooking appliance according to claim 2, wherein the guide hole is disposed across a top surface and a side surface of the knob.

4. The cooking appliance according to claim 1, wherein the recessed opening in the first light guide includes a coupling groove, and at least a portion of the second light guide is coupled to the coupling groove.

5. The cooking appliance according to claim 1, wherein the second light guide includes a portion having a cross-sectional area that increases in a direction in which light is guided.

6. The cooking appliance according to claim 1, further comprising a control module including a shaft and configured to control the heating source,
- wherein the knob includes a shaft housing, coupled with the shaft, configured to be rotated with the shaft.

7. The cooking appliance according to claim 6, wherein the shaft housing includes a rotation preventing protrusion configured to prevent relative rotation between the knob and the shaft, and the shaft includes a rotation preventing groove corresponding to the rotation preventing protrusion.

8. The cooking appliance according to claim 6, wherein the first light guide extends in a direction of a rotation axis of the knob and includes an insertion hole into which the knob is inserted.

9. The cooking appliance according to claim 1, further comprising a sealing member disposed between the light source and the panel to prevent moisture from penetrating into the light source.

10. A cooking appliance, comprising:
- a main body;
- a panel disposed in the main body and provided with a through hole; and
- a knob assembly coupled to the panel, the knob assembly including:
  - a knob including a knob base having a through hole,
  - at least one light source configured to emit light,
  - a light guiding cylinder configured to guide the light emitted from the light source to pass through the through hole of the knob base, at least a portion of the light guiding cylinder passing through the through hole of the knob base, the light guiding cylinder including a cylinder with a plate having a recessed opening, the plate extending from an end of the cylinder, and
  - a light guiding plate partially inserted into the recessed opening in the plate and configured to guide the light guided by the light guiding cylinder to an outside of the knob.

11. The cooking appliance according to claim 10, further comprising a shaft coupled with the knob, the shaft passing through the through hole of the panel, the light guiding cylinder, and the light guiding plate.

12. The cooking appliance according to claim 10, wherein the knob includes a first surface facing the panel, and the light guiding plate is coupled to the first surface.

13. The cooking appliance according to claim 12, wherein a rim of the first surface protrudes toward the panel so that the light guiding plate is fitted to the first surface.

14. The cooking appliance according to claim 10, wherein the knob assembly further includes a sealing member disposed between the light guiding cylinder and the light source to prevent moisture from penetrating into the light source.

15. The cooking appliance according to claim 10, wherein the light guiding cylinder and the light guide plate are integrally formed.

16. A knob assembly, comprising:
- a knob including a knob base having a through hole;
- at least one light source configured to emit light;
- a first light guide passing through the through hole of the knob base and arranged to guide the light emitted from the light source, the first light guide including a cylinder with a plate having a recessed opening, the plate extending from an end of the cylinder; and
- a second light guide partially inserted into the recessed opening in the first light guide and configured to guide the light guided by the first light guide to an outside of the knob.

17. The knob assembly according to claim 16, wherein the knob includes a guide hole penetrating at least a portion of the knob, and a portion of the second light guide is inserted into the guide hole.

18. The knob assembly according to claim 17, wherein the guide hole is disposed across a top surface and a side surface of the knob.

19. The knob assembly according to claim 16, wherein the recessed opening in the first light guide includes a coupling groove, and at least a portion of the second light guide is coupled to the coupling groove.

20. The knob assembly according to claim 16, wherein the second light guide includes a portion having a cross-sectional area that increases in a direction in which light is guided.

* * * * *